(No Model.)
W. F. PARISH.
PULLEY.
No. 352,837. Patented Nov. 16, 1886.
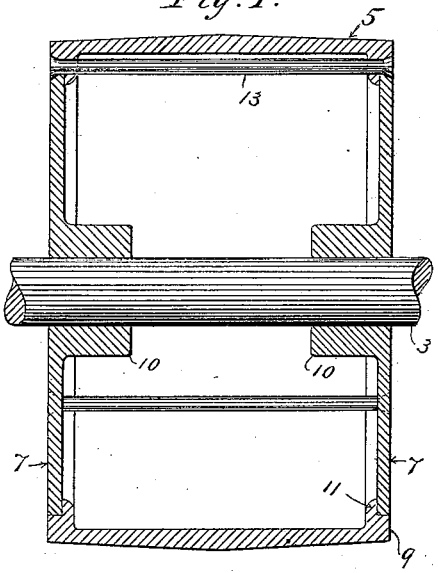
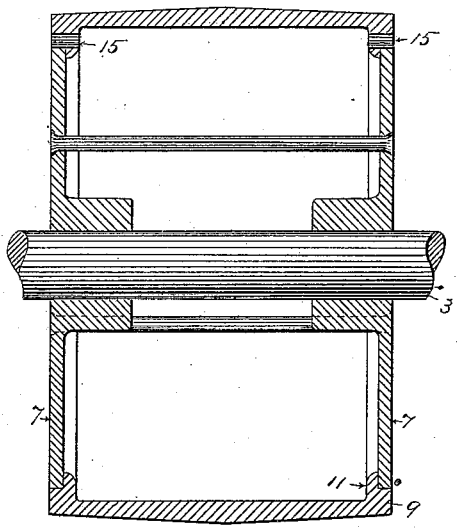
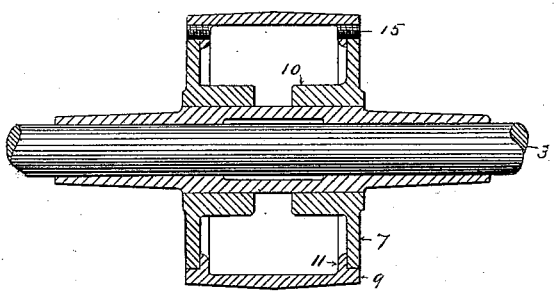
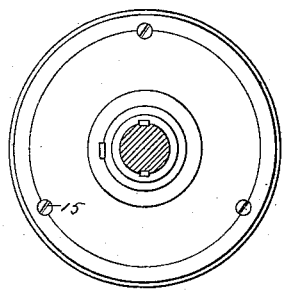
Witnesses
C. C. Paul
R. H. Sanford
Inventor
William F. Parish

UNITED STATES PATENT OFFICE.

WILLIAM F. PARISH, OF MINNEAPOLIS, MINNESOTA.

PULLEY.

SPECIFICATION forming part of Letters Patent No. 352,837, dated November 16, 1886.

Application filed May 5, 1886. Serial No. 201,167. (No model.)

*To all whom it may concern:*

Be it known that I, WILLIAM F. PARISH, of Minneapolis, in the county of Hennepin and State of Minnesota, have invented certain Improvements in Pulleys, of which the following is a specification.

This invention relates to improvements in the construction of metal pulleys that are designed for use upon machinery of various kinds. As heretofore generally constructed, these pulleys are provided with a rim, upon which the belt runs, a hub or boss that is secured to the shaft or arbor, and spokes or arms that extend between the hub and rim and support the latter. In some instances a flange or web extends from the hub to the rim, the entire pulley in this instance being cast in one piece. In these constructions the sides of the pulley are open, and considerable quantities of dirt, grit, dust, and oil usually accumulate within the pulleys, and thereby they are often thrown out of balance, causing them to run unevenly. This is especially the case with the pulleys that are used with saw-mill machinery.

The object of my invention is to provide a pulley with closed smooth sides, that prevent an accumulation of sawdust, dirt, &c., on the pulley.

In the accompanying drawings, forming part of this specification, Figure 1 is a longitudinal section of a pulley constructed in accordance with my invention. Figs. 2 and 3 are similar views showing different means for holding the parts of the pulley. Fig. 4 is a side elevation of the pulley shown in Fig. 3.

In the drawings, 3 represents a portion of a shaft or arbor upon which the pulley is mounted.

5 is the rim of the pulley. It may be of any desired size and weight. Secured to each side of the rim of the pulley is a smooth metal disk or plate, 7. These plates are provided with hubs or bosses 10, having openings through them to fit the shaft or arbor, and projecting into the interior of the pulley, thus having the outer surface entirely smooth.

I provide means for securing the parts of the pulley together, preferably as follows: The rim 5 is provided at each edge with an inwardly-projecting flange, 9, which serves both to stiffen the rim and to aid in holding the parts together. A lug or rib, 11, extends around the inner edge of this flange, forming with the flange an annular shoulder. The plates or disks 7 fit against these shoulders, the outer surfaces of the plates being flush with the edges of the rim. The construction might be reversed without departing from my invention, the shoulders being formed on the plates instead of on the rim. I provide a series of holes, that are preferably formed partly in the edges of the plates and partly in the flanges 9, as shown in Fig. 4, and through these holes I insert the rods or bolts 13, preferably riveting down the ends into countersunk openings, as shown in Fig. 1. By this means the plates and the rim are firmly secured together, so that the rim cannot turn independently of the plates, and the plates are held close against the shoulders, forming tight joints between the plates and rim, which exclude all dirt, dust, &c., from the interior of the pulley. Other means may be used for holding the plates and rim together.

In Fig. 2 I have shown the pulley with dowel-pins 15, that are inserted through the holes that are partly in the plates and partly in the flanges of the rim. These pins keep the rim from turning on the plates, and the plates are held against the rim by bolts 13, which are located at a point about midway between the arbor and rim.

In Fig. 3 I have shown the pulley with screws inserted into the holes in the plates and rim.

This pulley is especially adapted for use on saw-arbors, and on other shafts or arbors in saw-mill and other wood-working machinery, as there is no chance for sawdust to collect on it, and it therefore always remains in balance.

I claim as my invention—

1. The metallic pulley herein described, consisting of the plates or disks 7, having the smooth outer surfaces, the ring 5, supported wholly on said disks with its edges flush with their outer surfaces, and securing devices holding said plates and rim firmly together, all combined and arranged substantially as described, and for the purpose set forth.

2. The combination, in a pulley, of the plates 7, having the inwardly-projecting bosses 10, and having smooth outer surfaces, the ring 5, supported wholly on said plates, and having the projecting flanges 9, with shoulders formed therein, and having its edges flush with the outer surfaces of the plates, and securing means holding said parts together, substantially as described.

3. The combination, in a pulley, of the rim 5, having the flanges 9, with the annular shoulders formed therein, the plates or disks 7, having the inwardly-projecting bosses 10 and smooth outer surfaces flush with the edges of the rim, and the bolts 13, passing through bolt-holes formed partly in the plates and partly in the flanges 9, and securing said plates to said rim, all substantially as described.

In testimony whereof I have hereunto set my hand this 30th day of April, 1886.

WILLIAM F. PARISH.

In presence of—
A. C. PAUL,
WM. G. HENDERSON.